United States Patent

[11] 3,580,048

[72] Inventors Walter Trinks
 Bad Honnef;
 Theodor Karl Netzer, Pocking-Starnberg;
 Hans T. Victora, Bliesheim bei Lechenich;
 Hermann Saurer; Heinrich Von Paulgerg,
 Bonn, Germany
[21] Appl. No. 617,619
[22] Filed Feb. 21, 1967
[45] Patented May 25, 1971
[73] Assignee Berliner Mashinenbau A Gvorm. L.
 Schwartzkopff
 Bonn-Tannenbusch, Germany

[54] SIMULATOR FOR SIMULATING THE ACTION OF THE PRESSURE OF A SHOCK WAVE OF A NUCLEAR EXPLOSION
15 Claims, 4 Drawing Figs.

[52] U.S. Cl. ...................................................... 73/35
[51] Int. Cl. ...................................................... G01m 7/00
[50] Field of Search ........................................... 60/221,
 222, 39.48; 46/74 (A,B,C); 73/12, 147, 35; 222/5

[56] References Cited
UNITED STATES PATENTS

| 2,537,074 | 1/1951 | Mapes | 222/5X |
| 2,545,586 | 3/1951 | Pollack | 222/5X |
| 3,398,571 | 8/1968 | Montgomery et al. | 73/12 |
| 2,001,207 | 5/1935 | McManamna et al. | 60/39.48 |
| 2,724,966 | 11/1955 | Northrop et al. | 73/147 |
| 2,971,097 | 2/1961 | Corbett | 60/39.48 |

FOREIGN PATENTS

| X973,448 | 2/1960 | Germany | 60/221 |

OTHER REFERENCES
Aviation Week, Page 59, Oct. 12, 1959, Copy in Class 60 Sub 221

Primary Examiner—James J. Gill
Attorney—Arthur O. Klein

ABSTRACT: A simulator to simulate the effects of a nuclear explosion and wherein the simulator is adapted to be placed on the object to be tested. The simulator includes an outer housing in which is situated a thrust-producing means for producing a thrust having the nature of a rocket thrust, and a transfer means is carried by the housing for transferring from the latter the reaction of the thrust to the object to be tested. The housing has an opening through which a fluid discharges during action of the thrust-producing means, and this thrust-producing means may take the form of a body of water situated in the housing and acted upon by air under pressure. A burstable membrane closes the discharge opening of the housing, and an explosive is provided for bursting the membrane or diaphragm so as to release the pressure in the housing, the water being discharged therefrom by the air under pressure so as to provide a thrust which can be transmitted to the object to be tested for simulating the action of a nuclear explosion.

Patented May 25, 1971
3,580,048
2 Sheets-Sheet 1
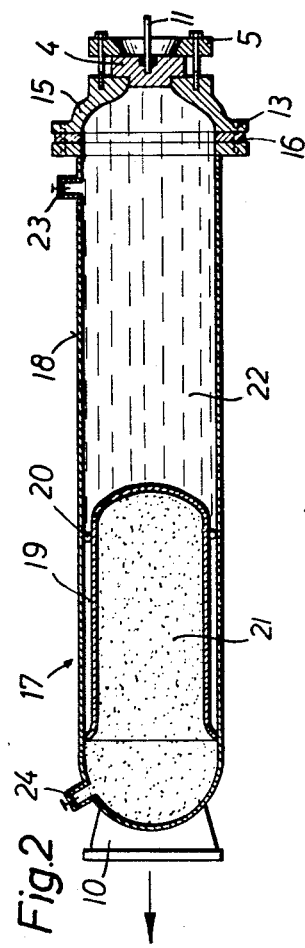
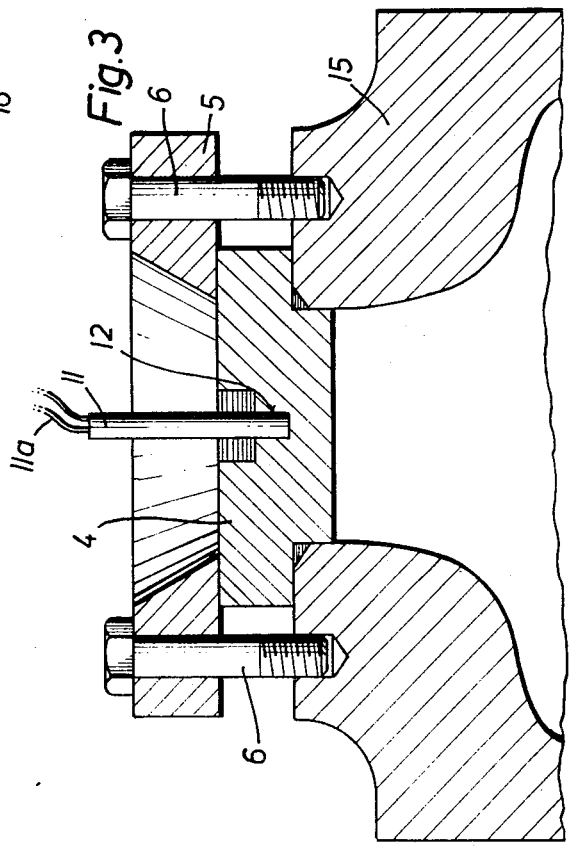
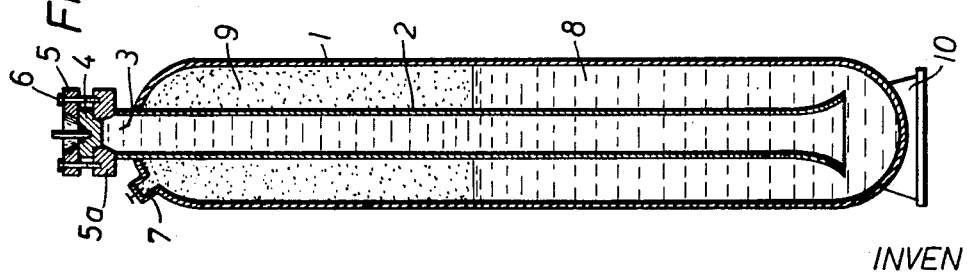
INVENTORS:
Dr. Walter TRINKS
Dr. Theodor Karl NETZER
BY: Hans T. VIKTORA
Heinrich von PAULGERG Hermann SAURER
Arthur O. Klein, Attorney Patented May 25, 1971

INVENTORS:
Dr. Walter TRINKS
Dr. Theodor Karl NETZER
BY: Hans T. VIKTORA
Heinrich von PAULGERG, Hermann SAURER Arthur O. Klein, Attorney 3,580,048

SIMULATOR FOR SIMULATING THE ACTION OF THE PRESSURE OF A SHOCK WAVE OF A NUCLEAR EXPLOSION

The present invention relates to a device for simulating the pressure action of the shock wave of a nuclear explosion. The present invention relates in particular to that type of simulator which is adapted to be mounted upon the object which is to be tested.

In order to test the strength of buildings or other structures situated above or below the ground, together with structures which lead to and from the test structures and other installations, there have already been provided devices which simulate the pressure action of a nuclear explosion in air at any desired location at which the peak pressure of the shock wave decays from a value which is on the order of 10 atmospheres. With such constructions it is also intended that the shock induced in the ground by the pressure wave should be transmitted so that it is possible to maintain substantially constant at different locations the pressure which spreads out in the ground.

With devices of this type it is necessary to take into consideration the fact that the structure which comes under the influence of the pressure of the nuclear explosion is situated at a distance from the location of the explosion at which the peak of the pressure is only at about a pressure of 10 atmospheres while having a relatively long period of action until the pressure drops to atmospheric pressure. This decay time of the shock wave can be, for example, about 1/5 sec. for a 20 kt explosion, while for one mt explosion the decay time will be on the order of 1.5 sec. As a result, even though the peak pressure is relatively small a considerable impulse is provided on the surface which is engaged by the shock wave, and this impulse is strong enough, for example, to provide for a concrete wall having a thickness of 1 meter a speed which approaches the speed of sound.

Although pressure simulators for the above purposes are known, consisting of conventional burstable bodies which are mounted on the object to be tested, these known simulators cannot produce an impulse which lasts for a sufficiently long time. Furthermore, there are simulators in the form of tubes in which air waves are achieved by suitable accelerating devices. These latter constructions are, however, very expensive and are only suitable for testing models. Moreover, it is known to use divided pressure chambers where the shock wave is achieved in such a way that one pressure chamber is instantaneously relieved of pressure so that a shock wave will act upon an object which is to be tested and which is situated in the middle of both chambers. This solution to the problem, however, is extremely expensive and can only be used for testing objects which can be placed in the test chambers. Moreover, with constructions of this type it is very difficult to achieve a steep rise in the peak pressure.

It is accordingly a primary object of the present invention to provide a pressure simulator of the above type where the above discussed drawbacks of the known structures are avoided while the simulator of the invention is completely suitable for its intended purpose.

In addition, it is an object of the present invention to provide a simulator arrangement wherein one or more simulators can be placed in any desired combination on the object which is to be tested to produce a wide variety of different types of shock waves for simulating the action of a nuclear explosion.

In accordance with the invention the simulator includes a housing means in which is situated a thrust-producing means which produces a thrust in the nature of a rocket thrust, and the reaction of this thrust is transmitted to the object which is to be tested by a transfer means which is connected to the housing for transmitting the reaction thrust thereof. The use of rocket-type of thrust-producing means as a simulator for simulating the pressure action of a shock wave has, as contrasted with presently known devices, the advantage of being capable of adjustment or design to produce any desired peak pressure with a relatively long period during which the impulse lasts.

Furthermore, the device of the invention can be mounted at the most widely different locations on an object to be tested which may have any exterior configuration on which the device of the invention is situated.

Furthermore, it is of particular advantage to make use of a water rocket type of construction inasmuch as this latter construction is extremely inexpensive in its operation, has practically no danger for the personnel handling the device, and is easily transportable.

It is also possible to use solid-fuel rockets of conventional construction where the arrangement thereof at the object to be tested and the amount of driving material situated therein can be varied so as to provide a predetermined peak pressure and duration of impulse. Also, hot water types of rockets lend themselves to use for the structure of the invention.

In accordance with our invention the simulator includes a housing in which is situated a thrust-producing means, and the housing has an opening through which a fluid of the thrust-producing means is adapted to discharge in order to achieve the desired reaction force. At the discharge opening there is located, in accordance with the invention, a burstable diaphragm designed to release the force of the thrust only when the desired peak pressure is reached. In order to achieve a steeply rising peak pressure, a distance of approximately 1 mm. between the rocket and the object to be tested may be provided, so that retarding of the peak pressure during transfer of the pressure release to the bottom of the rocket and thus to the object to be tested can be avoided.

A plurality of simulators of the invention can be combined into a group so as to have a common action. For this purpose a plurality of the simulators can be loosely bundled together in a holder on which they are mounted. The plurality of simulators can be distributed in groups for simultaneous or for sequential ignition. This result can be achieved by providing corresponding predetermined lengths for the fuse cords by means of which the simulators are ignited. Thus, by means of elongated ignition cords which can be detonated, and which have the property of being burned away at a predetermined rate such as at the rate of up to 8 km./sec., a predetermined number of rockets can be simultaneously ignited in an arrangement where from a common ignition point identical fuses of the same length respectively lead to the several explosive cords which are respectively arranged adjacent the burstable diaphragms in the several simulators of the invention. It is also possible to achieve a continuous pressure wave front if the rockets or groups thereof are arranged parallel to the pressure wave front which is to be simulated, by providing between the several groups corresponding lengths of fuse cords which will provide the desired retarding in the ignition of the several rockets.

In order to avoid an unsteadiness in the load which is transmitted to the object which is to be tested, the thrust from a plurality of rockets can be transmitted to the test object by way of a common baseplate. In order to transmit the thrust to a profiled object of irregular exterior surface, it is possible to use an intermediate transmission member which may take the form, for example, of a water-filled plastic container which adapts itself to the particular configuration of the object to be tested so as to uniformly transmit the thrust over an irregular surface thereof.

The invention is illustrated by way of example in the accompanying drawings which form part of this application and in which:

FIG. 1 is a schematic illustration of one possible embodiment of a water-rocket type of simulator according to the invention, this embodiment being used to achieve a vertical thrust;

FIG. 2 shows another embodiment of a water-type of rocket used as a simulator for the invention, the embodiment of FIG. 2 also being illustrated schematically and providing a horizontal thrust;

FIG. 3 is a fragmentary sectional view, on an enlarged scale as compared to FIGS. 1 and 2, showing details of the region of the structure where the burstable diaphragm is situated

Figure 4:
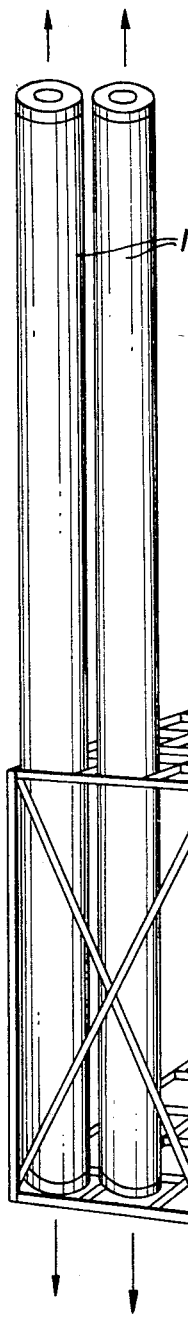
FIG. 4 is a schematic perspective illustration of the manner in which a plurality of the simulators of the invention can be grouped together so as to provide a vertical thrust.

The simulator of FIG. 1 is in the form of a water rocket which includes an outer housing 1 whose wall is strong enough to withstand the pressure prevailing in the interior thereof, and within the outer housing 1 is situated a thrust-producing means which includes a vertical tube 2 through which fluid under pressure is adapted to rise upwardly out of the simulator during operation thereof. In the illustrated example the riser tube 2 terminates at its upper end in a discharge nozzle 3. This latter nozzle provides an outlet for the outer housing 1, and this outlet is covered and closed by a closure means in the form of a burstable diaphragm 4 of suitable thickness, preferably made of hard paper, this diaphragm being clamped to the housing by means of an annular holding member 5. For this purpose suitable bolts or screws 6, which are schematically indicated, extend through the ring 5 and into the top end of the housing 1 or into a ring 5a fixed to the top end of the riser tube 2, where the latter projects upwardly beyond the housing 1, so as to fix the diaphragm 4 at its outer periphery in a clamped position between the ring 5 and the structure 5a toward which the latter is pressed by the screws 6.

As may be seen from FIG. 3, the diaphragm 4 carries an igniting structure 11 filled with an ignitable material and capable of being ignited by the burning of a suitable fuse cord 11a. The lower end of the ignitor 11 extends through a central sack bore 12 in the diaphragm 4. The diaphragm 4 is shown in FIG. 3 fixed by the screws 6 and by the clamping ring 5 to the head member 15 of a nozzle outlet of the outer housing of the rocket, or this nozzle outlet may form the top end 5a of the riser 2. Thus, in FIG. 2 the housing has the outlet 15 which forms a component of the housing whereas in FIG. 1 the outlet of the housing is formed by the upper nozzle end 3 of the riser tube 2. An annular sealing disc 16 is situated between the head member 15 and a flange of the housing 18, which parts are bolted together by the screws 13. When the explosive means of the igniting structure 11 explodes, the diaphragm 4 will burst and will be blown out. As may be seen from FIG. 1, the housing 1 is provided with a suitable inlet 7, schematically shown in the drawing, through which the housing is filled with water 8 and with compressed air 9.

The simulator of the invention includes, in addition to the above-described outer housing 1 and thrust-producing means therein, a thrust-transfer means for transferring the reaction thrust to the object to be tested, and for this purpose the housing 1 is fixed at its bottom end to a base member 10 which will be situated on the object to be tested to transmit the reaction thrust thereto.

By way of the opening 7 it is possible to situate in the interior of the housing 1 water up to any desired height and then through the same inlet 7 the remainder of the interior of the housing 1 is filled with air under pressure.

Upon bursting of the diaphragm 4, the water which is in the outer housing is displaced downwardly by the compressed air and will then rise upwardly through the central riser tube 2 and upwardly and outwardly through the discharge nozzle 3 to the outer atmosphere, and the thrust which results from the force of the issuing jet of water provides a reaction force at the transfer means 10 which receives this reaction force and transfers it to the object to be tested. In accordance with the particular pressure of the charge of compressed air and the predetermined relationship between the amount of compressed air and the amount of water, it is possible to set the simulator to provide any desired peak pressure and duration of impulse.

With the arrangement which is illustrated in FIG. 2, the simulator 17 is also in the form of a water rocket having an outer housing 18 which is strong enough to withstand the pressure of the charge within the housing. In this case there is situated within the cylindrical housing 18 a piston 19 which is slidable along the interior surface of the housing and which carries a suitable sealing ring 20 made of rubber or the like and slidably engages the interior surface of the housing 18. This sealing ring 20 prevents the compressed air 21 from contacting the water 22. The compressed air is introduced through an inlet 24 so as to fill the interior of the hollow piston 19 as well as the interior of the housing which is situated at the left of the piston 19, as viewed in FIG. 2, while the water is introduced through the inlet 23 with this embodiment. The jet of water will issue to the right, as shown by the arrow at the right of FIG. 2, while the reaction force will be transmitted to the left as shown by the arrow at the left of FIG. 2, through the thrust-transfer means 10 which is connected to the outer housing of the simulator.

FIG. 4 schematically illustrates a suitable holder 25 which is capable of accommodating a plurality of vertical simulators 1 of the present invention. Thus, the holder 25 is in the form of a simple framework having a top wall in the form of an open frame defining openings for receiving a plurality of the rockets 1, respectively, while the bottom wall of the framework which forms the holder 25 can serve either to receive the bottom ends of the simulators in suitable openings, respectively, or may take the form of a common continuous bottom wall through which the entire pressure can be transmitted from the several rockets.

Thus, with the structure of the invention it is possible to transmit the thrust to an area of any desired size with the thrust having any desired peak pressure and any desired duration of impulse. It will be understood that the above-described embodiments are only illustrations of the principles of the invention. Since many other variations and modifications thereof will now occur to those skilled in the art, it is intended that the scope of the appended claims not be limited to the specific embodiments herein contained.

We claim:

1. A simulator for simulating the pressure action of shock waves of a nuclear explosion by placing it on a building or on the ground near a building to be tested, comprising in combination, a housing having a discharge opening, means within said housing for ejecting a stream of fluent material through said opening to produce a reaction thrust on the housing opposite said discharge opening, burstable closure means closing said opening of said housing, and reaction transfer means operatively connected with said housing at a position opposite said opening for transmitting the reaction forces to a building or the ground near a building to be tested to simulate the pressure action of a shock wave.

2. The combination as set forth in claim 1, wherein said discharge opening has the form of a funnel-shaped passage having an inner end and an outer end, said passage being larger at said outer end than at said inner end.

3. The combination of claim 1 and wherein said burstable closure means is in the form of a burstable diaphragm, explosive means situated on said diaphragm vertically thereof.

4. The combination of claim 1 and wherein a plurality of said housings with a plurality of thrust-producing means therein and a plurality of reaction-transfer means operatively connected thereto, respectively, are provided at the object which is to be tested, said housings respectively having discharge openings through which fluids discharge from said housings during the action of said plurality of said thrust-producing means, a plurality of burstable diaphragms respectively closing said openings, a plurality of explosive means operatively connected with said burstable diaphragms for bursting the latter to initiate the action of said plurality of thrust-producing means, and a plurality of igniting means operatively connected with said plurality of explosive means for respectively providing simultaneous ignition thereof.

5. The combination of claim 4 and wherein said plurality of igniting means include fuse cords.

6. The combination of claim 5 and wherein said fuse cords are of equal lengths.

7. The combination of claim 5 and wherein said fuse cords are of different lengths.

8. The combination of claim 7 and wherein a plurality of groups of simulators are provided with the simulators of each group having fuse cords of the same length but with the different groups respectively having fuse cords of different lengths.

9. The combination of claim 4 and wherein a common support plate carries all of the simulators for transferring the force achieved thereby.

10. The combination of claim 1 and wherein said transfer means is adapted to an irregular profile of an object to be tested for transmitting the thrust thereto.

11. The combination of claim 1 and wherein a holder means is provided for removably holding a plurality of simulators.

12. The combination of claim 1 and wherein said thrust-producing means includes a body of water situated in said housing and a body of air under pressure acting on said water.

13. The combination of claim 12 and wherein a piston is slidable in said housing and is acted upon by the air under pressure for displacing water out of said housing.

14. The combination of claim 1 and wherein said housing and thrust-producing means form a solid fuel rocket.

15. The combination of claim 1 and wherein said housing and thrust-producing means form a hot water rocket.